United States Patent [19]

Hudecek

[11] Patent Number: 4,589,899

[45] Date of Patent: May 20, 1986

[54] SEALING GLASS

[75] Inventor: Carl J. Hudecek, Toledo, Ohio

[73] Assignee: Owens-Illinois, Inc., Toledo, Ohio

[21] Appl. No.: 668,246

[22] Filed: Nov. 5, 1984

[51] Int. Cl.$^4$ ............................................. C03C 3/066
[52] U.S. Cl. ............................................. 65/33; 65/36; 65/59.5; 501/15; 501/18
[58] Field of Search ..................... 65/33, 36, 59.5; 501/18, 15

[56] References Cited

U.S. PATENT DOCUMENTS 3,485,648 12/1969 Bishop ............................... 65/33 X
3,963,505 6/1976 Dumesnil et al. .................. 501/15
4,421,947 12/1983 Kyle ................................... 501/15 X

FOREIGN PATENT DOCUMENTS 2514346 10/1976 Fed. Rep. of Germany .......... 65/33

Primary Examiner—Robert Lindsay
Attorney, Agent, or Firm—John R. Nelson

[57] ABSTRACT

A crystallizable sealing glass composition in powered form that is a blend of a Pbo/ZnO/B$_2$O$_3$/SiO$_2$/BaO glass in the vitreous state and a small effective amount of finely divided zinc zirconium silicate as a nucleating agent. The zinc zirconium silicate has an average particle size of about 2 to 8 microns and is used alone, or in combination, with zirconium silicate having an average particle size of about 20 to 30 microns. The glass composition can be used to seal television picture tubes at 440° C. or 460° C. with excellent results, the early stages of crystallization showing large crystals and large glassy area, as well as DTA curve peaks at 15 to 25 minutes at 440° C.

10 Claims, 3 Drawing Figures

GLASS OF THE INVENTION

440°C

460°C

PRIOR ART GLASS

440°C

460°C

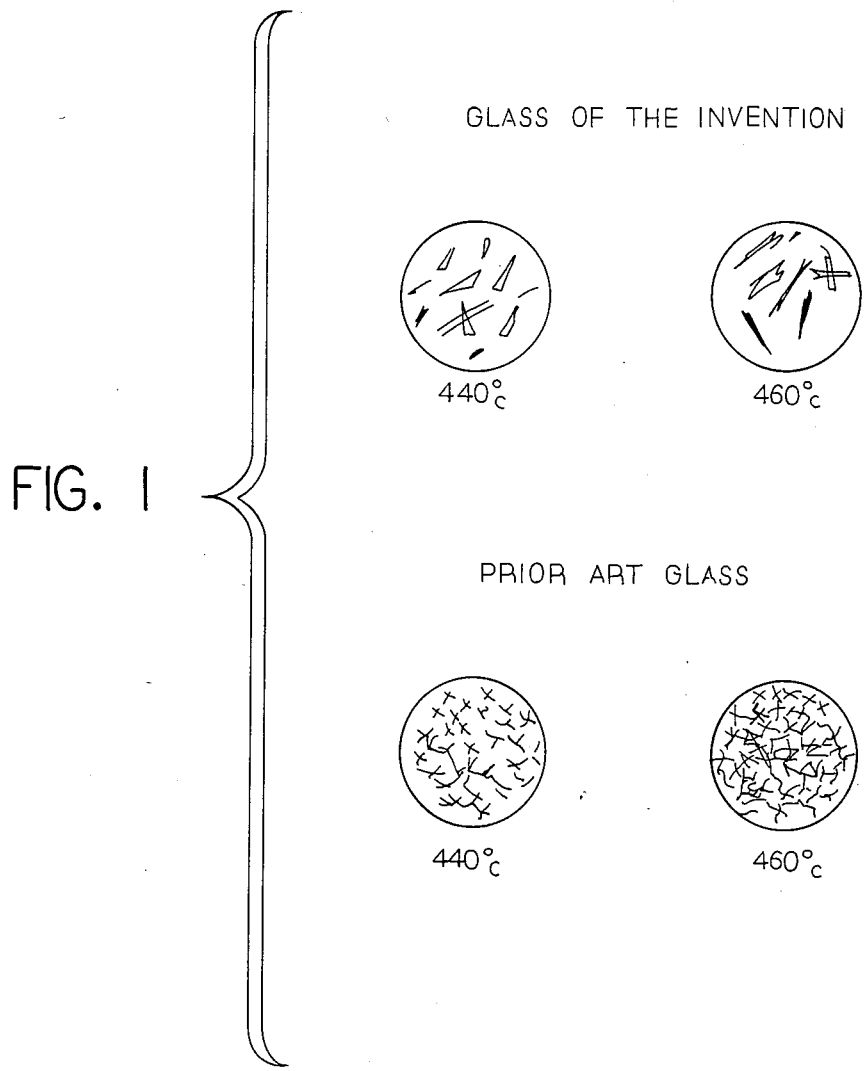

ized glass as a nucleating agent, or by adding various simple refractory silicates. These attempts were not successful in obtaining a sealing glass with a wide sealing temperature tolerance (sealing at 440° C. to 460° C.), and these glasses did not have the optimum crystal development to produce strong adhesion.

SEALING GLASS

The present invention relates to sealing glass compositions in powdered form for sealing glass components such as television picture tubes.

BACKGROUND OF THE INVENTION

Crystallizable sealing glass compositions in powdered form have been used to seal television picture tubes to provide devitrified glass seals. The resultant seals must have a suitable combination of properties such as appropriate thermal expansion characteristics, good flow to produce proper fillets, good wetting to provide strong adhesive characteristics to the glass parts being sealed, and good crystallization properties, including a proper rate of crystallization and proper size and distribution of crystals, to allow formation of strong crystallized seal within a reasonable thermal soak time.

Generally, in the past, in an attempt to produce desireable crystals, the glasses were self-nucleating through chemical makeup, or they were nucleated by adding pre-crystallized glass, or by adding various simple refractory silicates. These attempts were not successful in obtaining a sealing glass with a wide sealing temperature tolerance (sealing at 440° C. to 460° C.), and these glasses did not have the optimum crystal development to produce strong adhesion.

The use of precrystallized glass as a nucleating agent is described in the Hudecek U.S. Pat. No. 3,947,279, assigned to Owens-Illinois, Inc. This patent is incorporated by reference for its background content and its description of standard tests in the art such as the D.T.A. (Differential Thermal Analysis) curve and the button flow test.

U.S. Pat. No. 3,963,505 to Dumesnil (Technology Glass Corporation) shows crystalizable lead boron glasses or lead zinc boron glasses in powdered form, the glasses being blended with relatively large amount of a non-inert zinc oxide containing material that includes zinc zirconium silicate. The patent is seeking a lower sealing temperature and uses the zinc oxide containing material as a filler in relatively large amounts, at least 3 wt. % and as high as 30 wt. %. The filler acts as a source of zinc oxide, resulting in a glass which has lower sealing temperature and faster crystallization. This type of glass is suitable for sealing microelectronic packages, but is not suitable for sealing television picture tubes.

There is a need to provide a crystallizable sealing glass which can be processed at faster rates (at higher temperatures) in television bulb sealing and a glass that has a broader tolerance for sealing temperature variation, say from 440° C. to 460° C.

OBJECTS OF THE INVENTION

It is an object of the present invention to provide a crystallizable glass sealing composition in powdered form comprising a crystallizable $PbO/ZnO/B_2O_3/SiO_2/BaO$ glass and finely divided zinc zirconium silicate as the nucleating agent, the glass having an excellent balance of physical properties including the ability to tolerate a broad range of sealing temperatures from a low temperature of about 440° C. to a high temperature of about 460° C., or more.

It is an object of the present invention to provide a method of sealing a crystallizable glass sealing composition in a television picture tube component, the method including:

A. providing a crystallizable glass having the following ingredients in approximate percent by weight:

| Ingredient | Percent By Wt. |
|---|---|
| PbO | 73 to 76 |
| ZnO | 12 to 13.3 |
| $B_2O_3$ | 8 to 9 |
| $SiO_2$ | 1.8 to 2.3 |
| BaO | 1.8 to 2.1; |

B. mixing finely divided particles of the glass with an effective amount of zinc zirconium silicate as a nucleating agent, the zinc zirconium silicate having an average particle size of about 2 to 8 microns, and;

C. heating the glass composition at about 440° C. to 460° C. to provide an excellent devitrified seal.

It is an object of the present invention to provide a crystallizable sealing glass composition in powdered form comprising a crystallizable $PbO/ZnO/B_2O_3/SiO_2/BaO$ glass in the vitreous state and an effective nucleating agent amount of zinc zirconium silicate, the glass composition having a wide processing latitude with respect to heat sealing temperatures and providing an excellent devitrified glass seal.

DESCRIPTION OF THE DRAWINGS

These and other objects of the present invention will be apparent from the specification that follows, the appended claims, and the drawings, in which:

FIG. 1 is a magnified top plan view of sealing glasses showing the early stages of crystallization. The top two glasses are made according to the present invention and show the desired large crystals and large glassy area at 440° C. and at 460° C. The bottom two magnified glasses at 440° C. and 460° C. show the present (prior art) glasses, which have a large number of small crystals and a small glassy area.

THE INVENTION

Figure 3:
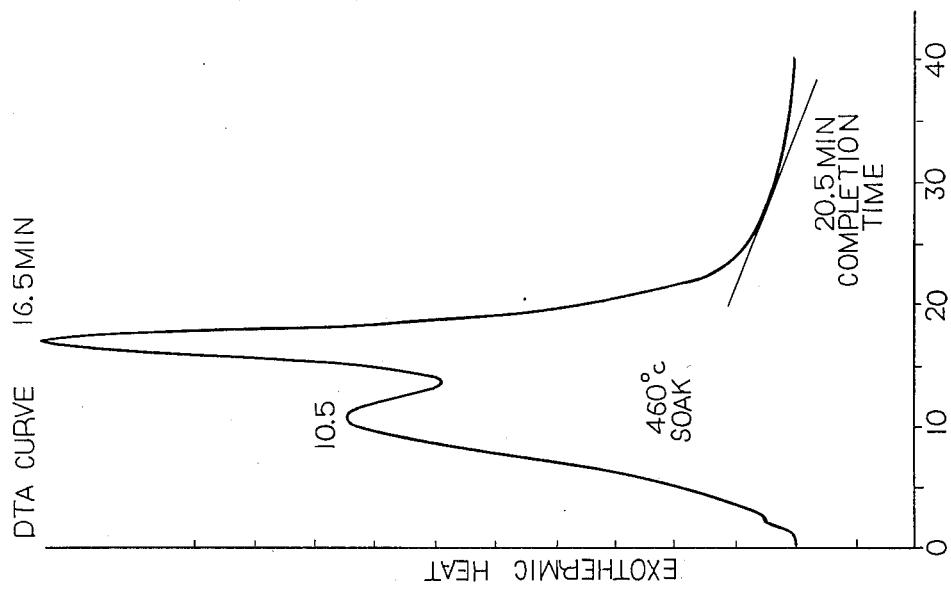
FIG. 3 shows a DTA curve run on the glass sample of FIG. 2 at a 460° C. soak, the curve showing a peak of 16.5 minutes.

The present invention provides a glass composition in powder form for sealing television picture tubes, the glass composition having suitable flow, wetting and crystallization properties as evidenced by thermal DTA curves and other tests, the composition comprising a crystallizable $PbO/ZnO/B_2O_3/SiO_2/BaO$ glass in the vitreous state and an effective amount of zinc zirconium silicate as a nucleating agent for crystallizing the glass and providing a devitrified glass seal.

The present invention also provides a method of sealing a crystallizable glass sealing composition in a television picture tube component, the method comprising the steps of:

A. providing a crystallizable glass having the following ingredients in approximate percent by weight:

| Ingredient | Percent By Wt. |
|---|---|
| PbO | 73 to 76 |

-continued

| Ingredient | Percent By Wt. |
| --- | --- |
| ZnO | 12 to 13.3 |
| $B_2O_3$ | 8 to 9 |
| $SiO_2$ | 1.8 to 2.3 |
| BaO | 1.8 to 2.1; |

B. mixing finely divided particles of the glass with an effective amount of zinc zirconium silicate as a nucleating agent, the zinc zirconium silicate having an average particle size of about 2 to 8 microns, and;

C. heating the glass composition at about 440° C. to 460° C. to provide a seal for a television picture tube, the sealing glass having suitable flow, expansion and wetting properties to provide a strong problem free seal, the crystallizing glass having a peak of about 15 to 25 minutes as evidenced by a DTA curve when the composition is heated at 440° C.

The crystallizable glass is prepared as is well known in the art, it being in powdered form (about 20 to 30 microns and preferably about 20 to 25 microns as the average particle size) and generally comprises the following ingredients in approximate percent by weight:

| Ingredient | Percent By Wt. |
| --- | --- |
| PbO | 73 to 76 |
| ZnO | 12 to 13.3 |
| $B_2O_3$ | 8 to 9 |
| $SiO_2$ | 1.8 to 2.3 |
| BaO | 1.8 to 2.1 |

The glass composition preferably comprises the following ingredients in approximate percent by weight:

| Ingredient | Percent By Wt. |
| --- | --- |
| PbO | 74.8 to 75.6 |
| ZnO | 12.1 to 12.4 |
| $B_2O_3$ | 8.17 to 8.70 |
| $SiO_2$ | 2.08 to 2.18 |
| BaO | 1.92 to 2.02 |

The outstanding results of the present invention are obtained by using zinc zirconium silicate alone (or in combination with 18 to 35 microns average particle diameter zirconium silicate) as a nucleating agent. The zinc zirconium silicate particle size generally is about 2 to 8 microns and preferably about 3 to 6 microns. The amount of zinc zirconium silicate is generally about 0.07 wt. % to about 0.4 wt. %, the preferred amount being about 0.08 or 0.09 up to about 0.15 wt. %. These weight percents are based on the weight of the crystallizable glass.

When used, the amount of zirconium silicate is generally about 0.07 to 0.4 wt. % of the glass and preferably about 0.15 to 0.3 wt. %. The average particle size of the zirconium silicate is generally about 18 to 35 microns and preferably about 20 to 30 microns. The present invention solves a problem of providing a sealing glass that can be effectively used in production at heat sealing temperatures as low as about 440° C. and high as 460° C. or more. Previous attempts to get the correct desired relatively slow early crystallization rate were unsuccessful by using, for instance, crystallizable glass or zirconium silicate alone as a nucleating agents. In the prior art glasses, attempting to reduce the 460° C. early crystallization by adding less nucleant (such as zirconium silicate) resulted in a sealing glass whose crystallization completed too slowly at 440° C., as borne out in DTA curves, which show time of peak crystallization and time of completion of crystallization.

The present invention provides a glass that crystallizes at the appropriate desired rate at 440° C., 450° C. and 460° C. The glass of the present invention shows the novel early crystallization as represented in FIG. 1 with large crystals and a large glossy area. The glass of the present invention also has the desired DTA curves showing desired crystallization rates, the resulting devitrified glass also having good flow, good wetting and good rod seal tests.

While not wishing the be bound by theory, apparently the zinc zirconium silicate nucleating agent produces microscopic zones of higher zinc levels in the glass, which causes growth of the proper desired large crystals for the best wetting. The appropriate number and type of nucleation sites apparently are also provided.

In general, slightly different results are produced by slightly finer of slightly coarser averge particle sizes of the powdered sealing glass composition. The following working examples are illustrative of typical outstanding sealing glasses made according to the present invention.

EXAMPLE 1

A powdered crystallizable glass in the vitrious state was thoroughly mixed with 0.3 wt. % based on the glass weight zinc zirconium silicate having an average particle of about 5 microns and about 0.3 wt. percent based on the glass weight of zirconium silicate having an average particle size of 20 to 30 microns. The resultant powdered sealing glass had an average particle size of 20 to 25 microns.

Some of this powdered sealing glass was heated to 440° C. and some was heated to 460° C. for examination of the early crystallization stages because of the known criticality of delayed but fast crystallization required for sealing glasses used in sealing television picture tubes.

Under a magnification of 63X, the early crystallization stages were similar to the representation of the devitrifying glass of the invention at 440° C. and 460° C. shown in FIG. 1 in which there were some large crystals and more glassy areas.

Figure 2:
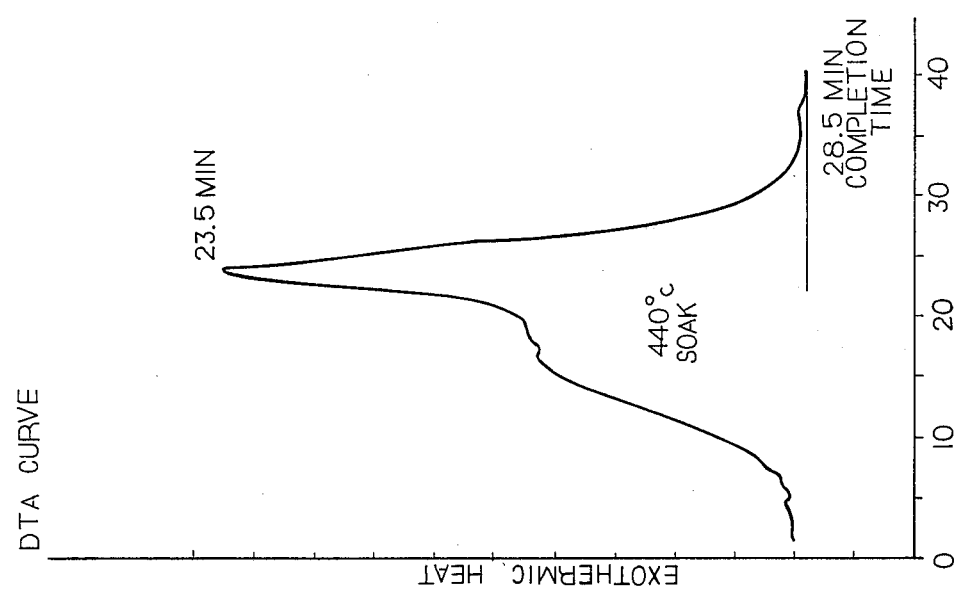
FIG. 2 shows a DTA curve performed on a glass of the present invention with a 440° C. soak, the curve showing a peak at 23.5 minutes.

Differential Thermal Analysis (DTA) curves were run on samples of the powdered sealing glass using 440° C. and 460° C. soaks. The resultant DTA curves were like those shown in FIGS. 2 and 3. In the 440° C. soak DTA curve, there was a peak at 23.5 minutes, the completion time being 28.5 minutes (FIG. 2). In the 460° C. DTA curve (FIG. 3), there was a peak of 16.5 minutes and a completion time of 20.5 minutes. Hence, there was not a great drop of the peak times if the glass was subjected to 440° C. soak, or to 460° C. soak. In addition, the early stages of the crystallization of each of the 440° C. and the 460° C. sealing cycles showed large crystals surrounded by more glassy area as is the case in the prior art glasses which show small crystals and less glassy area.

The powdered sealing glass was used as a sealant for television picture tubes, the heating for sealing being in the range of 440° C. and 460° C. The devitrified glass seals were excellent. The measured sealing glass properties were excellent, the material exhibiting a button flow of 1.080 and a rod seal value of 590 psi compression in the sealing glass.

EXAMPLE 2

A crystallizable sealing glass composition was prepared as described in Example 1, except that the amount of zinc zirconium silicate used was 0.07 wt. % and the fineness was an average particle size of 3 microns.

Some of the powdered (20 to 25 microns) sealing glass was heated at 460° C. to examine the early stages of crystallization. The desired patterns of large crystals and large glassy areas was found as shown in FIG. 1. A 440° C. and a 460° C. soak DTA curve were both satisfactory, the 440° C. curve showing a peak at 20 minutes and a completion time of 25 minutes. The 460° C. soak DTA curve had a peak at 9.5 minutes and a completion time of 13.5 minutes.

The powdered sealing glass was used to seal television tubes over the range 440° C. to 460° C. The resultant seals were excellent, demonstrating a sealing glass that has a broad range of tolerance of sealing temperature variation, the glass being used successfully at 440° C., 450° C., and 460° C.

Other desired properties of the devitrified sealing glass were maintained, the buton flow being 1.10 inches and the road seal test being 330 psi (compression).

The working examples show the outstanding devitrified glass seals obtained using zinc zirconium silicate having an average particle size of about 2 to 8 microns as a nucleating agent. The large amount of zinc zirconium silicate, 3 to 30 wt. % based on the glass, used as a filler in the previously mentioned U.S. Pat. No. 3,963,505 would not provide the same results—the composition of the above patent having a very fast crystallization rate and the generally seeks a lower sealing temperature as its main thrust.

In addition, it is thought that the present invention apparently produces more crystals with a 1:2:1 mole ratio of $PbO:ZnO:B_2O_3$ compared to the prior art glass mole ratio of 2:1:1 ($PbO:ZnO:B_2O_3$).

The novel sealing glass of the present invention provides a button flow of generally about 1.02 "to 1.16" and preferably about 1.05 "to 1.13". The rod seal stress tests (450° C.-30 minutes) generally are about 100 psi (C) to 1500 psi (C, compression) and preferably about 100 psi (C) to 800 psi (C) when measured by sealing to reference glass that has an average linear coefficient of expansion (25° to 300° C.) of $95 \times 10^{-7}/°C$.

The novel sealing glass composition, when heated to 440° C. for sealing, exhibits a peak time of about 15 to 25 minutes and a completion time of about 20 to 30 minutes. The DTA curve at 460° C. shows a peak and completion times reasonably close to the above described ranges, the value usually being only about 5 to 10 minutes lower.

As illustrated in FIG. 1, the volume of each of the large crystals of the novel glass is about 3 to 40 or 50 times the volume of each of the small crystals of the prior art glass. Generally the average diameter of the large crystal of the novel glass is approximately at least about 0.003 in and may be as large as about 0.01 to 0.03 or more as compared to an average diameter of the prior art glass small crystals which have a size about 0.0005 to 0.001 in. As illustrated in FIG. 1, generally the lower the sealing temperature, the smaller the crystal size.

The presence of larger and fewer crystals during early crystallization provides a sealing glass with superior wetting properties and less sensitivity to higher heating rates during sealing of television bulbs.

What is claimed is:

1. A sealing glass composition in power form for sealing television picture tubes, the glass composition having suitable flow, wetting and crystallization properties as evidenced by thermal DTA curves and other tests, the composition comprising a crystallizable $PbO/ZnO/B_2O_3/SiO_2/BaO$ glass in the vitreous state and an effective amount of zinc zirconium silicate as a nucleating agent for crystallizing the glass and providing a devitrified glass seal, there also being used zirconium silicate having a particle size of 18 to 35 microns.

2. A composition as defined in claim 1 in which the glass composition comprises the following ingredients in approximate percent by weight:

| Ingredient | Percent By Wt. |
|---|---|
| PbO | 73 to 76 |
| ZnO | 12 to 13.3 |
| $B_2O_3$ | 8 to 9 |
| $SiO_2$ | 1.8 to 2.3 |
| BaO | 1.8 to 2.1 |

3. A composition as defined in claim 1 in which the glass composition comprises the following ingredients in approximate percent by weight:

| Ingredient | Percent By Wt. |
|---|---|
| PbO | 74.8 to 75.6 |
| ZnO | 12.1 to 12.4 |
| $B_2O_3$ | 8.17 to 8.70 |
| $SiO_2$ | 2.08 to 2.18 |
| BaO | 1.92 to 2.02 |

4. A composition as defined in claim 1 in which the amount of zinc zirconium silicate is about 0.07 to 0.40 weight percent of the glass.

5. A method of sealing a crystallizable glass sealing composition in a television picture tube component, the method comprising the steps of:

A. providing a crystallizable glass having the following ingredients in approximate percent by weight:

| Ingredient | Percent By Wt. |
|---|---|
| PbO | 73 to 76 |
| ZnO | 12 to 13.3 |
| $B_2O_3$ | 8 to 9 |
| $SiO_2$ | 1.8 to 2.3 |
| BaO | 1.8 to 2.1; |

B. mixing finely divided particles of the glass with an effective amount of zinc zirconium silicate as a nucleating agent, the zinc zirconium silicate having an average particle size of about 2 to 8 microns, and;

C. heating the glass composition at about 440° C. to 460° C. to provide a seal for a television picture tube, the sealing glass having suitable flow, expansion and wetting properties to provide a strong problem free seal, the crystallizing glass having a peak of about 15 to 25 minutes as evidenced by a DTA curve when the composition is heated at 440° C.

6. A crystallizable sealing glass composition for sealing television picture tubes at a temperature of about 440° C. to 460° C., the composition comprising a glass having the following ingredients in approximate percent by weight:

| Ingredient | Percent By Wt. |
| --- | --- |
| PbO | 74.9 |
| ZnO | 12.5 |
| $B_2O_3$ | 8.5 |
| $SiO_2$ | 2.1 |
| BaO | 2.0, | the composition comprising finely divided particles of the glass and about 0.08 percent by weight based on the glass of zinc zirconium silicate having an average particle size of about 3 to 4 microns.

7. A composition as defined in claim 2 in which zirconium silicate having an average particle size of about 20 to 30 microns is used with the zinc zirconium silicate.

8. A composition as defined in claim 3 in which the amount of zinc zirconium silicate is about 0.07 to 0.4 wt. % and the average particle size is about 3 to 6 microns, there being also used about 0.07 to 0.4 wt. % of zirconium silicate having an average particle size of about 20 to 30 microns.

9. A sealing glass composition in powder form for sealing television picture tubes, the glass composition having suitable flow, wetting and crystallization properties as evidenced by thermal DTA curves and other tests, the composition comprising a crystallizable $PbO/ZnO/B_2O_3/SiO_2/BaO$ glass in the vitreous state and an effective amount of zinc zirconium silicate as a nucleating agent for crystallizing the glass and providing a devitrified glass seal, the zinc zirconium silicate having a particle size of about 2 to 8 microns and being present in an amount of about 0.7 to 0.4 weight percent based on the weight of the composition.

10. A method as defined in claim 5 in which zirconium silicate is used with the zinc zirconium silicate, the zirconium silicate having a particle size of about 18 to 35 microns.

* * * * *